(12) United States Patent
Nakakita

(10) Patent No.: US 7,591,180 B2
(45) Date of Patent: Sep. 22, 2009

(54) CONTACT INSPECTION DEVICE, AND CONTACT INSPECTION DEVICE AND METHOD FOR MAGNETIC DISK DEVICE

(75) Inventor: Masaru Nakakita, Ehime (JP)

(73) Assignee: Panasonic Corporation, Osaka (JP)

( * ) Notice: Subject to any disclaimer, the term of this patent is extended or adjusted under 35 U.S.C. 154(b) by 408 days.

(21) Appl. No.: 10/578,511

(22) PCT Filed: Oct. 27, 2004

(86) PCT No.: PCT/JP2004/015911

§ 371 (c)(1),
(2), (4) Date: May 8, 2006

(87) PCT Pub. No.: WO2005/045838

PCT Pub. Date: May 19, 2005

(65) Prior Publication Data

US 2007/0070533 A1  Mar. 29, 2007

(30) Foreign Application Priority Data

Nov. 10, 2003 (JP) .............................. 2003-379743

(51) Int. Cl.
*G01N 29/07* (2006.01)
(52) U.S. Cl. .......................................... 73/597; 73/649
(58) Field of Classification Search ........... 73/597–600, 73/649
See application file for complete search history.

(56) References Cited

U.S. PATENT DOCUMENTS 6,105,432 A * 8/2000 Taniguchi et al. .............. 73/649

FOREIGN PATENT DOCUMENTS

| JP | 63-314444 | | 12/1988 |
|---|---|---|---|
| JP | 2-117708 | | 9/1990 |
| JP | 02226047 A | * | 9/1990 |
| JP | 08-297816 | | 11/1996 |
| JP | 11-203637 | | 7/1999 |
| JP | 2000-076634 | | 3/2000 |
| JP | 2000-173032 | | 6/2000 |
| JP | 2000-251431 | | 9/2000 |

\* cited by examiner

*Primary Examiner*—Hezron Williams
*Assistant Examiner*—Nashmiya S Fayyaz
(74) *Attorney, Agent, or Firm*—Steptoe & Johnson LLP

(57) ABSTRACT

A contact inspection method and device in which a detection element which produces a detection output according to vibration of a rotating body is mounted on the rotating body to detect contact of an object with the rotating body, more particularly a method and device suitable for evaluating mechanical characteristics of a rotating magnetic disk (1) and a slider (2) in a magnetic disk device are provided. A detection element (12) which produces a detection output according to vibration is mounted on a rotating body (1). The detection output is transmitted to a stationary portion through a rotary transformer (33*h*). The rotating body (1) rotates based on the transmitted detection output. The rotary transformer has a sufficient impedance with which the detection element obtains a predetermined output in a portion of an effective sensitivity band of the detection element.

9 Claims, 12 Drawing Sheets

CONTACT INSPECTION DEVICE, AND CONTACT INSPECTION DEVICE AND METHOD FOR MAGNETIC DISK DEVICE

CLAIM OF PRIORITY

This application claims priority under 35 USC 371 to International Application No. PCT/JP2004/015911, filed on Oct. 27, 2004, which claims priority to Japanese Patent Application No. 2003-379743, filed on Nov. 10, 2003, each of which is incorporated by reference in its entirety.

TECHNICAL FIELD

The present invention relates to a contact inspection method and device in which a detection element which produces a detection output according to vibration of a rotating body is provided on the rotating body to detect contact of an object with the rotating body. More particularly, the present invention relates to a contact inspection method and device suitable for evaluating mechanical characteristics and tribological characteristics of a magnetic disk which is a recording medium in a magnetic disk device and a slider on which a magnetic head is mounted.

BACKGROUND ART

A magnetic disk device for magnetically recording and reproducing information is a high-precision device in which, to perform recording or reproduction of information, a slider on which a magnetic head is mounted is floated above a recording/reproduction surface of a magnetic disk which is a recording medium, with a spacing maintained generally constantly therebetween. The slider is attached to a distal end of an actuator arm of the magnetic disk device. The slider incorporates a magnetic head for performing at least one of recording and reproduction of information. Ordinarily, the magnetic head is placed in an air lubrication surface of the slider in the vicinity of an air-flow-out end thereof, which opposes the magnetic disk. An air flow generated with the rotation of the magnetic disk is drawn into the space between the air lubrication surface and the magnetic disk surface, thereby floating the slider from the magnetic disk.

The slider thus floats above the rotating magnetic disk. The floating altitude corresponds to the thickness of the air lubrication film, i.e., the distance between the magnetic disk surface and the slider. Thus, the surface of the slider facing the magnetic disk forms an air lubrication surface to form and maintain self-pressurizing air lubrication film between the slider and the magnetic disk. This film ensures that the slider and the magnetic disk do not easily contact each other during rotation of the magnetic disk, and that friction and wear are limited.

In recent years, the data recording density of magnetic disk devices has been remarkably increased. It is said that the rate of increase in recording density is 100% per year. This remarkable increase in recording density has been achieved by use of a GMR head having improved high-density reproduction characteristics and by reducing the track pitch of recording tracks in the magnetic disk surface. However, it is also necessary to simultaneously reduce the amount of floating of the slider in which a magnetic head is mounted from the magnetic disk. The amount of floating is presently reduced to an extremely small value of about 10 nm. There is a demand for further reducing the amount of floating, and the importance of evaluations of mechanical characteristics and tribological characteristics of magnetic disks for assurance of the reliability of devices is increasing.

Various inspection devices have been used to make such evaluations. One of them is a device for inspection of contact between a slider and a magnetic disk. For example, techniques and so on disclosed in Japanese Patent Publication No. 6-40065 and Japanese Patent Laid-Open No. 8-297816 are known as a contact inspection device of this kind.

FIG. 12 shows an example of a device conventionally used for inspection of contact between a slider and a magnetic disk. In FIG. 12, reference numeral 1 denotes a magnetic disk which is a recording medium; reference numeral 2 a slider on which a magnetic head (not shown) for performing signal recording/reproduction on or from the magnetic disk 1; reference numeral 3 a spindle which is a rotating and holding mechanism which rotates the magnetic disk 1 while holding the magnetic disk 1; reference numeral 7 a spindle drive circuit which drives the spindle 3; reference numeral 6 an arm which supports the slider 2; reference numeral 5 a voice coil motor which drives the arm 6; and reference numeral 8 an actuator drive circuit which drives the voice coil motor 5.

The magnetic disk 1 is fixed on the spindle 3, for example, by screw fastening or the like. The slider 2 is made of a ceramic material typified by $Al_2O_3$—TiC for example. An air lubrication surface, not shown in the figure, is formed in a surface of the slider 2 facing the magnetic disk 1 by machining, etching, or the like.

The arm 6 is capable of springy action in the direction of pressing toward the magnetic disk 1. The air lubrication surface of the slider 2 is pressed against the recording/reproduction surface of the magnetic disk 1 with a constant load of, for example, 20 mN. The arm 6 is attached to the voice coil motor 5 and rotates on the shaft of the voice coil motor 5 through a certain range of 30 degrees for example. With the rotation of the voice coil motor 5, the arm 6 swings generally parallel to the recording/reproduction surface of the magnetic disk 1. With this action, the slider 2 moves generally in a radial direction of the magnetic disk 1.

An AE sensor 12 provided as a vibration detecting element is mounted on the arm 6. The AE sensor 12 is constituted by a piezoelectric element (PZT) for example. The AE sensor 12 detects acoustic elastic waves (acoustic emission, hereinafter referred to as AE) and outputs corresponding electrical signals.

Reference numerals 20 denotes a wide-band amplifier which amplifies the signal output from the AE sensor 12; reference numerals 30 a filter circuit which extracts frequency components necessary for contact inspection from a signal output from the wide-band amplifier 20; and reference numerals 50 an oscilloscope which displays a signal output from the filter circuit 30.

The operation of this contact inspection device will be described. This kind of conventional inspection device was devised to inspect the condition of contact between the slider 2 and the magnetic disk 1 of a magnetic disk device using a start/stop system called a CSS (contact start/stop) system. When the spindle 3 is stopped, the magnetic disk 1 is in contact with the slider 2. The slider 2 has the air lubrication surface in the face facing the recording/reproduction surface of the magnetic disk 1. When the spindle 3 starts rotating, the slider 2 starts gradually floating by drawing an air flow generated with the rotation of the magnetic disk 1 into the space between the slider 2 and the magnetic disk 1.

The voice coil motor 5 moves the arm 6 to move the slider 2 to a predetermined position generally in a radial direction of the magnetic disk 1. When the spindle 3 enters a state of rotating at a high constant speed (e.g., 5400 rpm), the slider 2 floats while generally constantly maintaining a spacing between the slider 2 and the magnetic disk 1 by maintaining the self-pressurizing air lubrication film formed between the slider 2 and the magnetic disk 1. When the spindle 3 is stopped, the slider 2 again contacts the magnetic disk 1. Thus, the magnetic disk 1 contacts the slider 2 when stopped, and the slider 2 is floated during rotation of the magnetic disk 1 to maintain the magnetic disk 1 and the slider 2 in a non-contact state.

In spindle 3 rotation starting and stopping processes, the slider 2 and the magnetic disk 1 contact and slide on each other. With this contact and sliding, AE is generated. This AE is detected by the AE sensor 12. Even when the magnetic disk 1 is rotating, attachment of dust to the slider 2 or configurational defect of the magnetic disk 1 may cause contact between the slider 2 and the magnetic disk 1, which is accompanied by generation of AE. This AE is detected by the AE sensor 12.

The voltage of the detection signal from the AE sensor 12 at this time is very low, several microvolts to several hundred microvolts. However, the detection signal includes information relating to the contact caused between the slider 2 and the magnetic disk 1.

The detection output from the AE sensor 12 is amplified by the wide-band amplifier 20 to an observable level (e.g., 40 to 60 dB), noise components are then removed from the amplified detection output by the filter circuit 30, and the resultant signal is displayed on the oscilloscope 50.

Characteristics of the contact including the strength and duration are evaluated on the basis of the results of observation of the waveform of the output signal from the AE sensor 12 displayed on the oscilloscope 50.

The contact inspection device presently used generally has been described. In the case where the AE sensor 12 is mounted on the arm 6, however, not only AE generated by the contact between the slider 2 and the magnetic disk 1 but also vibrations of the arm 6 and the slider 2 are simultaneously detected by the AE sensor 12. A contact inspection device has therefore been devised as disclosed in Japanese Patent Laid-Open No. 2000-173032, which uses, as a method of measuring the condition of contact between the slider 2 and the magnetic disk 1 more accurately, an arrangement in which the AE sensor 12 is mounted on the magnetic disk 1 side and the detection signal from the AE sensor 12 is transmitted to the wide-band amplifier 20 through a slip ring, thereby preventing the detection of vibration of the arm 6 or slider 2 by the AE sensor 12. In Japanese Patent Laid-Open No. 2000-173032, the possibility of transmission by means of a rotary transformer of the detection signal from the AE sensor 12 mounted on the magnetic disk side is proposed.

A method of transmitting the detection signal by using the rotary transformer disclosed in Japanese Patent Laid-Open No. 2000-173032 will be described with reference to FIGS. 13 and 14.

FIG. 13 is a block diagram of a contact inspection device constructed by using a rotary transformer, and FIG. 14 is a sectional view of spindle 3 used in the contact inspection device shown in FIG. 13.

In FIG. 14, reference character 3a denotes a rotor having a shaft 3c. The shaft 3c is rotatably supported by a radial bearing 3d fixed on a stator 3b.

Reference characters 3g and 3f respectively denote rotary transformers placed so as to respectively face an outer surface of the radial bearing 3d and the rotor 3a. Reference characters 3n and 3m connection terminals on the primary and secondary sides of the rotary transformers 3g and 3f. Reference character 3h denotes an annular permanent magnet attached to the rotor 3a. Reference character 3i denotes a coil fixed to the stator 3b and facing the permanent magnet 3h. The permanent magnet 3h and the coil 3i constitute a motor.

A fluid bearing construction is provided which includes grooves formed in the shaft 3c and the thrust bearing 3e and a bearing portion filled with oil. Dynamic pressure of oil produced by rotation maintains a non-contact condition between the shaft 3c and the radial bearing 3d and between the shaft 3c and the thrust bearing 3e.

The spindle 3 shown in FIG. 14 has a fluid bearing structure, as described above, and is therefore free from occurrence of sliding between the rotor and the stator with the rotation of the spindle 3, unlike contact-type bearings using a ball bearing or the like. Also, an electrical signal can be extracted from the rotor 3a side to the outside of the rotating body in a non-contact manner by means of the rotary transformers 3g and 3f.

Accordingly, in use of the thus constructed spindle 3, the output terminal of the AE sensor 12 mounted on the magnetic disk side 1 is connected to the connection terminal 3m on the primary side of the rotary transformer 3f (see the arrow to 3f'), while the connection terminal 3n on the secondary side of the rotary transformer 3g is connected to the input terminal of the wide-band amplifier 20 as indicated by arrow 3g', thus enabling the detection signal from the AE sensor 12 to be extracted to an external measuring circuit system in a non-contact manner.

This arrangement is free from the risk of mechanical noise generated by slide contact between the slip ring and brushes from being superimposed on the detection signal from the AE sensor 12, and therefore offers the advantage of ensuring a further improvement in accuracy.

Among start/stop systems for magnetic disk devices in recent years, the system in which the slider 2 is directly loaded on the magnetic disk surface 1 and directly unloaded from the magnetic disk surface, i.e., the so-called ramp load system, is becoming prevalent. There is a demand for grasping the condition of contact between the magnetic disk 1 and the slider 2 in the direct loading and direct unloading processes.

However, vibration of the arm 6 or the slider 2 occurs during direct loading and direct unloading since direct loading and direct unloading are accompanied by turning of the arm 6. It is extremely difficult to evaluate contact between the slider 2 and the magnetic disk 1 by using the contact inspection device having the AE sensor 12 mounted on the arm 6 and presently used generally.

Also, the strength of AE accompanying contact between the slider 2 and the magnetic disk 1 in the direct loading and direct unloading processes in the ramp load system are one severalth to one several tenth of that in the case of the CSS system, and the duration of AE in the same situation is markedly short, about 1 ms. Therefore there is a need to measure the output voltage and time response with extremely high accuracy even if the AE sensor 12 is mounted on the magnetic disk side. In doing so with the slip ring transmission system, the detection signal cannot be accurately captured because the influence of slide noise generated between the slip ring and brushes is large. Also, piezoelectric elements typified by the AE sensor 12 ordinarily have a considerably high internal impedance and an optimum transmission system design is required for transmission from such a sensor even in the case where the rotary transformer is used.

In the direct unloading process, the air lubrication film formed between the slider 2 and the disk 1 is scraped off, so that a so-called squeeze force acts on the slider 2 in the magnetic disk 1 direction. There are two of contact between the slider 2 and the magnetic disk 1 in the direct unloading process: a first mode in which the slider 2 and the magnetic disk 1 are brought into contact with each other by the action of the squeeze force in the process of scraping off the air lubrication film; and a second mode in which after scraping off of the air lubrication film the arm 6 on which the slider 2 vibrates as a result of scraping off of the air lubrication film and the vibration of the arm 6 causes the slider 2 to contact the magnetic disk 1. In the conventional art, however, these two modes cannot be evaluated separately from each other.

The present invention has been achieved in consideration of these problems, and an object of the present invention is to optimize the characteristics of an electrical circuit including a rotary transformer and an AE sensor 12 in the contact inspection method and device having the AE sensor 12 mounted on the rotating body side, i.e., the magnetic disk 1 side, and to thereby implement measurement of contact between the slider 2 and the magnetic disk 1 with higher accuracy in comparison with the conventional art. Another object of the present invention is to identify modes of contact between the slider 2 and the magnetic disk 1 in the direct unloading process and to enable the mode to be evaluated separately from each other. In the present invention, a proposition is made to identify modes of contact between the slider 2 and the magnetic disk 1 in the direct unloading process and to separately evaluate the modes while using the method of mounting the AE sensor on the magnetic disk 1 side.

DISCLOSURE OF THE INVENTION

The present invention provides a contact inspection method for inspecting vibration conditions of a magnetic disk, a slider and a suspension, based on detection outputs from a detection element attached to the magnetic disk and a detection element attached to the slider, the magnetic disk being rotatable, the slider having a head for performing at least one of recording and reproduction on and from the magnetic disk and pressed toward the magnetic disk by the suspension, the suspension being held by a slider holding mechanism, the magnetic-disk-side detection element being attached to the magnetic disk to detect vibration of the magnetic disk, the slider-side detection element being attached to one of the slider, the suspension and the slider holding mechanism, wherein the method comprises obtaining a time difference between a maximum value of the detection output from the magnetic-disk-side detection element and a maximum value of the detection output from the slider-side detection element, determining a condition of contact between the slider and the magnetic disk, evaluating intensity of the contact between the slider and the magnetic disk, and detecting vibration due to the contact between the slider and the magnetic disk out from a plurality of kinds of vibration.

The present invention provides a first contact inspection device comprising a rotating magnetic disk, a slider having a head for performing at least one of recording and reproduction on and from the magnetic disk and pressed toward the magnetic disk by a suspension, a slider holding mechanism for holding the suspension, a magnetic-disk-side detection element attached to the magnetic disk and detecting vibration of the magnetic disk, and a slider-side detection element attached to one of the slider, the suspension and the slider holding mechanism, the contact inspection device inspecting vibration conditions of the magnetic disk, the slider and the suspension, based on detection outputs from the magnetic-disk-side detection element and the slider-side detection element, wherein the contact inspection device further comprises a measurement device for obtaining a time difference between a maximum value of the detection output from the magnetic-disk-side detection element and a maximum value of the detection output from the slider-side detection element in order to detect vibration due to contact between the slider and the magnetic disk out from a plurality of kinds of vibration. According to this invention, modes of contact between the slider and the magnetic disk occurring in a direct unloading process in a ramp load system are identified and a time difference between the corresponding outputs is measured. The present invention therefore has the advantage of ensuring evaluation with accuracy.

The present invention provides a second contact inspection device comprising a magnetic disk fixed on a rotary holding mechanism and rotated, a slider having a head for performing at least one of recording and reproduction on and from the magnetic disk, and a detection element attached to the rotary holding mechanism and detecting vibration of the magnetic disk, the contact inspection device inspecting vibration conditions of the magnetic disk, based on detection output from the detection element, wherein the rotary holding mechanism has a magnetic disk fixing portion constituted by an AE transmission flat plate parallel to the magnetic disk surface, and the detection element is fixed on a surface of the AE transmission flat plate opposite from the magnetic disk contact surface. This invention has the advantage of ensuring that the disk can be easily replaced and the desired close contact with the magnetic disk can be maintained by maintaining pressure contact with the magnetic disk so that attenuation of vibration can be restrained.

To achieve the above-described objects, the present invention provides the contact inspection method in which a detection element which produces a detection output according to vibration of a rotating body is attached to the rotating body, the detection output is transmitted to a fixing portion through a rotary transformer, and the condition of vibration of the rotating body is inspected on the basis of the transmitted detection output. In this method, the rotary transformer has a sufficient impedance with which the detection element obtains a predetermined output at least in a portion of an effective sensitivity band of the detection element. This invention has the advantage of limiting the attenuation of the output signal detected by the detection element to ensure that vibration can be detected with improved sensitivity.

The contact inspection method in which a rotating magnetic disk, a slider having a head for performing at least one of recording and reproduction on or from the magnetic disk and pressed toward the magnetic disk by a suspension, a slider holding mechanism which holds the suspension, a magnetic-disk-side detection element which is attached to the magnetic disk and which detects vibration of the magnetic disk, and a slider-side detection element attached to the slider, the suspension or the slider holding mechanism are provided and the conditions of vibrations of the magnetic disk, the slider and the suspension are inspected on the basis of detection outputs from the magnetic-disk-side detection element and the slider-side detection element. In this method, a measurement device is provided which obtains a time difference between a maximum value of the detection output from the magnetic-disk-side detection element and a maximum value of the detection output from the slider-side detection element in order to detect vibration due to contact between the slider and the magnetic disk from a plurality of kinds of vibration. This invention has the advantage of ensuring that modes of contact between the slider and the magnetic disk occurring in a direct unloading process in a ramp load system are identified and evaluation is performed on the basis of the identification results.

Further, the present invention provides the contact inspection device including a magnetic disk fixed on a rotary holding mechanism and rotated, a slider having a head for performing at least one of recording and reproduction on or from the magnetic disk and a detection element which is attached to the rotary holding mechanism and which detects vibration of the magnetic disk, the contact inspection device inspecting the condition of vibration of the magnetic disk on the basis of a detection output from the detection element, wherein a magnetic disk fixing portion of the rotary holding mechanism is constituted by an AE transmission flat plate parallel to the magnetic disk surface, and the detection element is fixed on the surface of the AE transmission flat plate opposite from the magnetic disk contact surface. This invention has the advantage of ensuring that the disk can be easily replaced and the desired close contact with the magnetic disk can be maintained by maintaining pressure contact with the magnetic disk so that attenuation of vibration can be restrained.

As described above, according to the contact inspection method and the detection device, the attenuation in a transmission path of the output signal detected by the detection element mounted on the rotating body side is limited to ensure that AE can be detected with improved sensitivity, or the output signal detected by the detection element can be amplified so that AE can be detected with improved sensitivity.

Further, modes of contact between the slider and the magnetic disk occurring in a direct unloading process in a ramp load system are identified, and evaluation can be made, or the easiness with which the magnetic disk 1 is replaced is improved and the desired closeness of contact with the magnetic disk 1 is ensured by pressure contact with the magnetic disk 1 to limit the attenuation of AE.

BEST MODE FOR CARRYING OUT THE INVENTION

Embodiments of the present invention will be described.

Embodiment 1

Embodiment 1 of the present invention will be described with reference to FIGS. 1 to 7.

Figure 1:
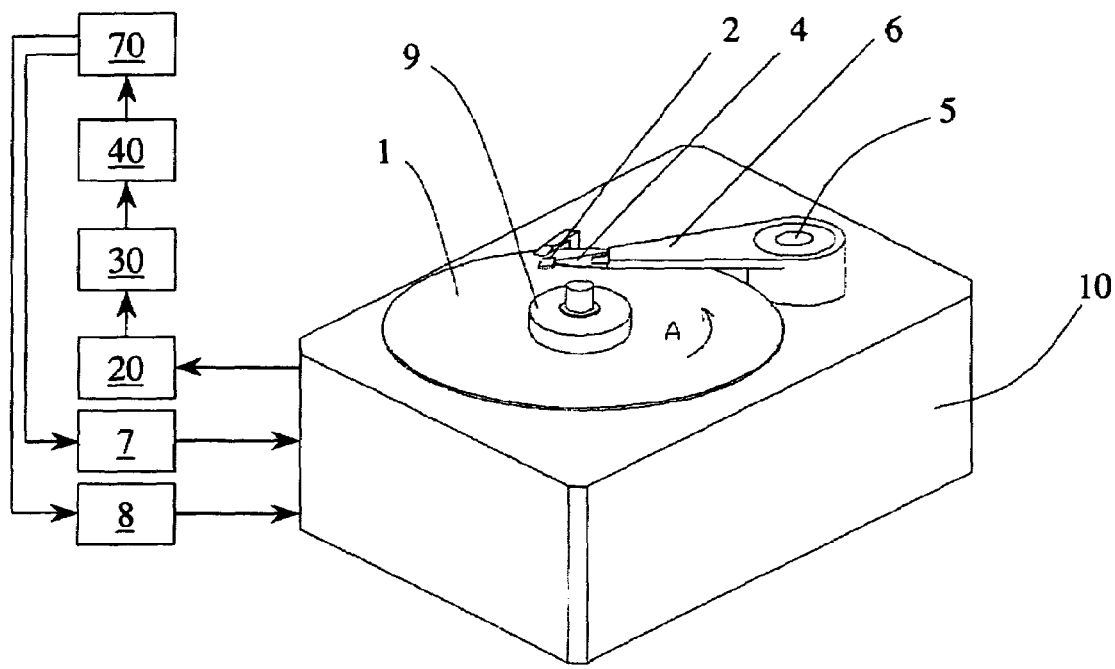
FIG. 1 is a block diagram of a contact inspection device in Embodiment 1 of the present invention.
Figure 12:
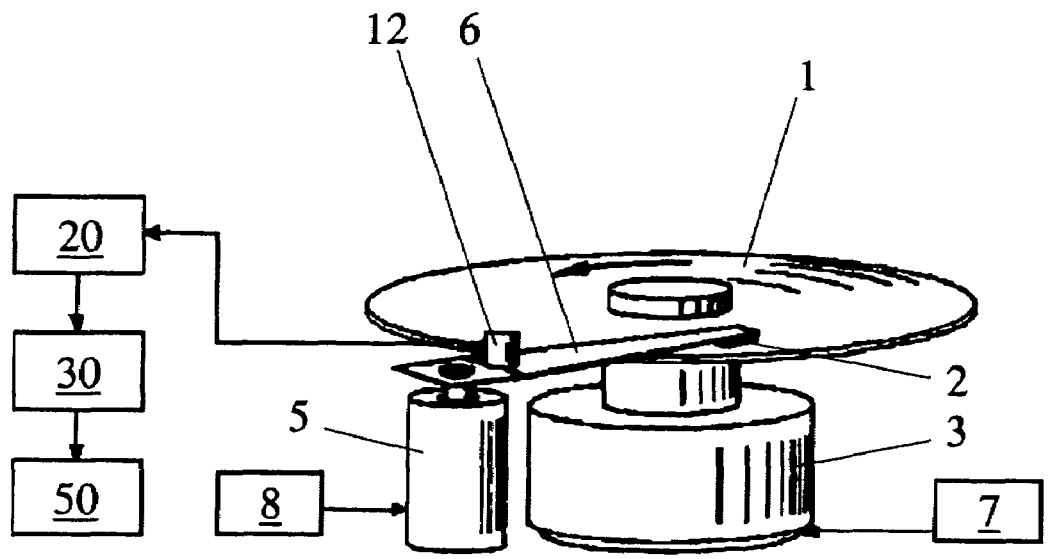
FIG. 12 is a block diagram of a conventional contact inspection device.
Figure 13:
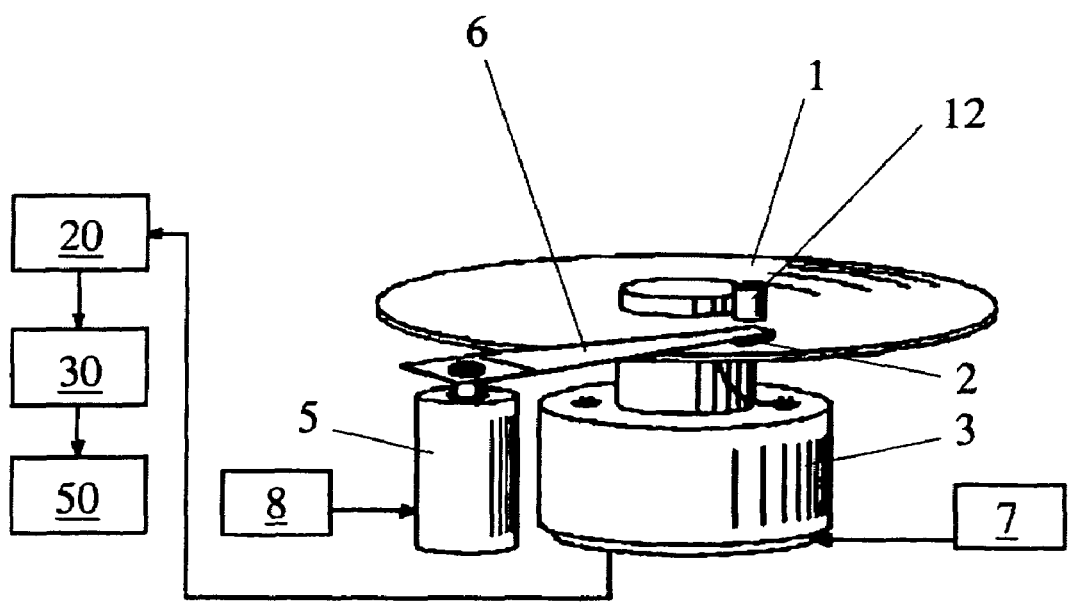
FIG. 13 is a block diagram of a conventional contact inspection device which detects AE from the magnetic disk side.
Figure 14:
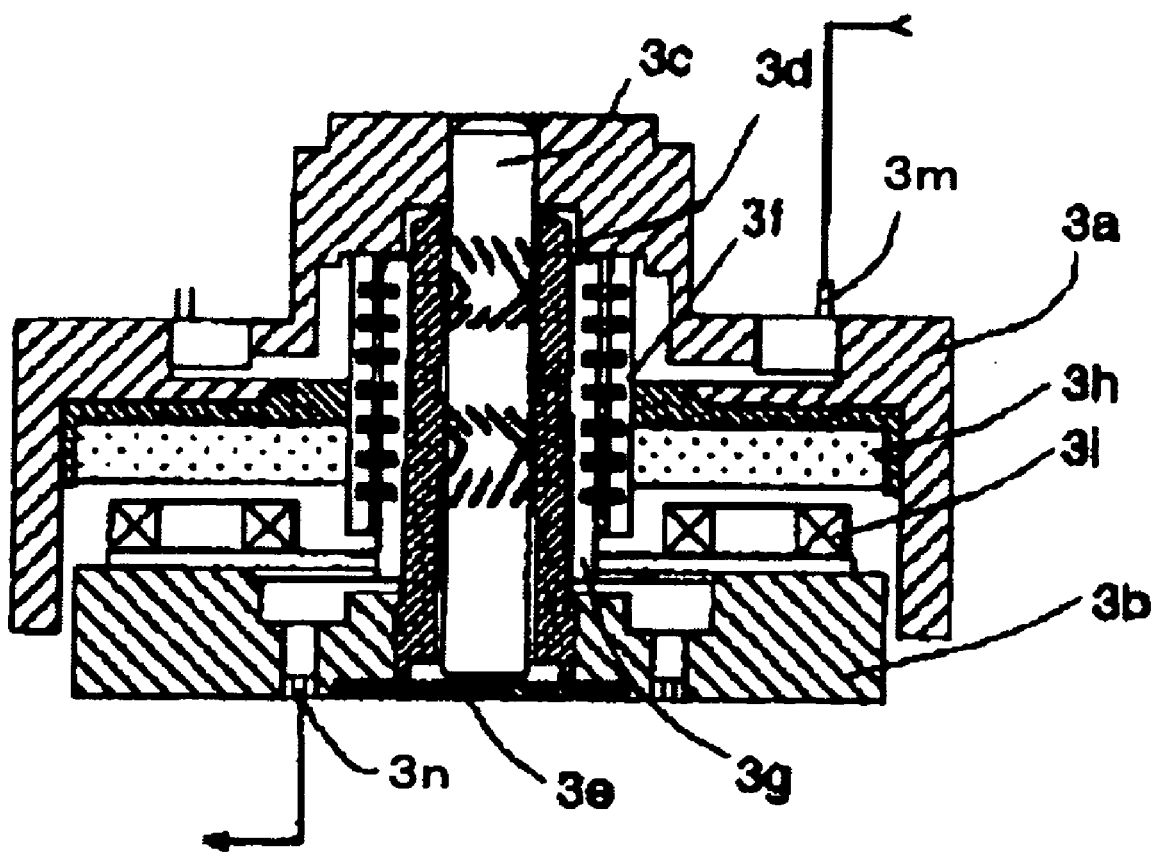
FIG. 14 is a sectional view of a spindle of the contact inspection device shown in FIG. 13.

FIG. 1 is a block diagram showing a contact inspection device in Embodiment 1 of the present invention. Portions corresponding to those in the conventional art shown in FIGS. 12 to 14 are indicated by the same reference numerals, and will not be described in detail.

In FIG. 1, reference numeral 1 denotes a magnetic disk; reference numeral 2 a slider; reference numeral 4 a suspension; reference numeral 5 a voice coil motor; reference numeral 6 an arm; reference numeral 7 a spindle drive circuit; reference numeral 8 an actuator drive circuit; and reference numeral 9 a disk clamp. Reference numerals 10 denote a frame. The magnetic disk 1 is fixed on a spindle (not shown) in the frame 10 by the disk clamp 9. Reference numerals 20 denote a wide-band amplifier; reference numerals 30 a filter circuit; reference numerals 40 an effective value computation circuit provided as an effective value computation device for computing the effective voltage value of the AE sensor 12 from a signal output from the filter circuit 30; and reference numerals 70 a computation control circuit which controls each of the drive circuits 7 and 8 and executes various kinds of computational processing, and which is constituted by a personal computer or the like.

Figure 2:
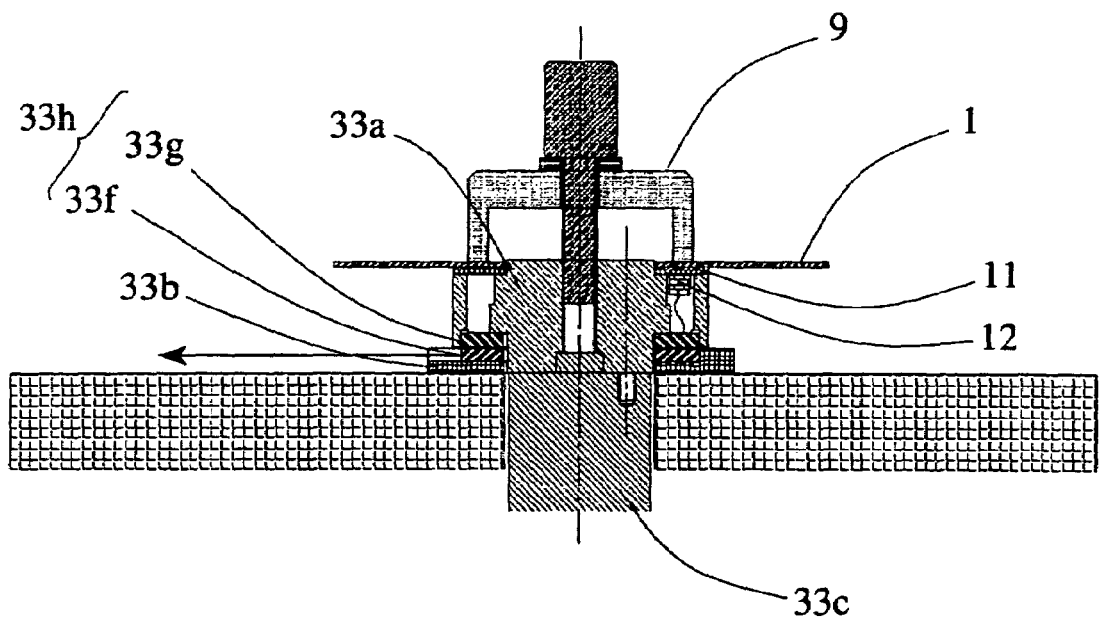
FIG. 2 is a sectional view of the contact inspection device in Embodiment 1 of the present invention.

FIG. 2 is a sectional view of the contact inspection device. In FIG. 2, reference character 33a denotes a rotor; reference character 33b a stator; reference character 33c a shaft extending from a spindle (not shown); reference character 33g a rotor-side transformer; and reference character 33f a stator-side transformer. The rotor-side transformer 33g is fixed to the rotor 33a, while the stator-side transformer 33f is fixed to the stator 33b, with a small gap maintained between the rotor-side transformer 33g and the stator-side transformer 33f, with which they are facing to each other in parallel. A rotary transformer 33h is thus formed.

An annular AE transmission flat plate 11 is interposed between the lower surface of the magnetic disk 1 and the rotor 33a. When the magnetic disk 1 is fixed to the rotor 33a, the disk clamp 9 is fixed with screws so that the AE transmission flat plate 11 is in close contact with the magnetic disk 1. There is a need to increase the closeness of contact between the magnetic disk 1 and the AE transmission flat plate 11 for the purpose of limiting the attenuation of AE. In Embodiment 1, the AE transmission flat plate 11 has the same surface condition as the magnetic disk 1. Accordingly, the surface roughness of the AE transmission flat plate 11 is set to Ra<0.3 nm and a layer of lubricant having a thickness of 2 nm larger than the surface roughness is applied to the surface. The surface of the magnetic disk 1 is formed in the same manner. Therefore the desired closeness of contact between the magnetic disk 1 and the AE transmission flat plate 11 is maintained by the effect of the surface flatness and the lubrication film when the disk clamp 9 maintains the magnetic disk 1 and the AE transmission flat plate 11 in pressure contact with each other. The AE sensor 12 is bonded to the lower surface of the AE transmission flat plate 11 by an epoxy adhesive or the like. AE generated in the magnetic disk 1 by contact between the slider 2 and the magnetic disk 1 is detected as a voltage value by the AE sensor 12 through the AE transmission flat plate 11.

A detection signal from the AE sensor 12 is transmitted from the rotor-side transformer 33g to the stator-side transformer 33f to be extracted to the measuring circuit system outside the spindle as indicated by the arrow in FIG. 2. The extracted signal from the AE sensor 12 is amplified by about 40 dB to 60 dB by the wide-band amplifier 20 in order to obtain a voltage high enough for checking of the effective voltage value. An amplifier having a frequency range from 100 Hz to 10 MHz for example is used as the wide-band amplifier 20. If an amplifier having such a range is used, the signal can be amplified without any loss since the frequency of the measured AE signal is about several ten kHz to several MHz. Unnecessary low-frequency components of the output signal amplified by the wide-band amplifier 20 are removed by the filter circuit 30 having a cutoff frequency of 100 kHz for example. The output signal is thereafter input to the effective value computation circuit 40.

The effective value computation circuit 40 computes, from the signal which passed through the filter circuit 30, the effective voltage value of the detection signal from the AE sensor 12, and supplies this value to the computation control circuit 70.

Figure 3:
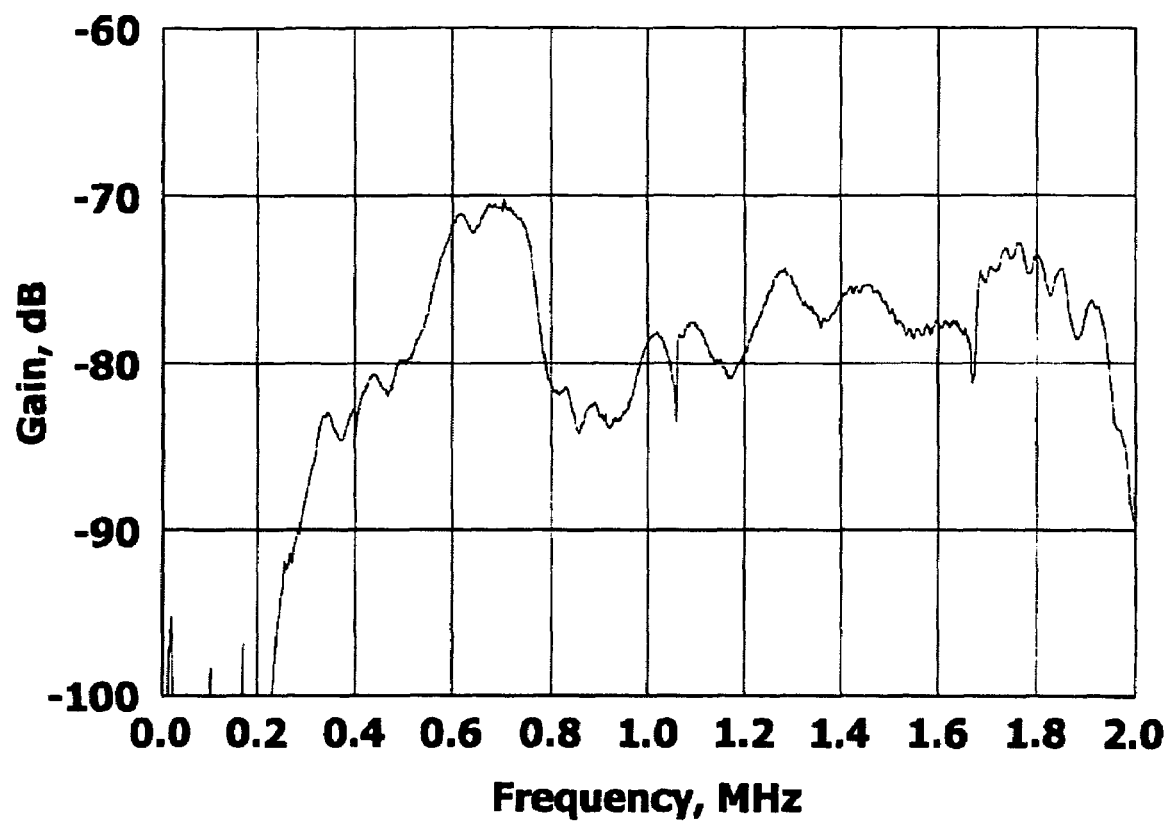
FIG. 3 is a diagram showing an output-frequency characteristic of an AE sensor used in Embodiment 1 of the present invention.

FIG. 3 shows a detection sensitivity curve of the AE sensor 12. It can be understood from FIG. 3 that the AE sensor 12 used in Embodiment 1 has the maximum sensitivity at about 600 to 700 kHz and a sensitivity of one tenth or more of the maximum sensitivity is ensured through a frequency range from about 300 kHz to about 2 MHz. It can also be understood that the sensitivity decreases abruptly outside the frequency range. It is thought that the effective sensitivity band in which the AE sensor 12 is substantially able to detect AE is from 300 kHz to 2 MHz.

By considering the above-described characteristics of the AE sensor 12, the contact inspection device in Embodiment 1 was made so that the output voltage from AE at 300 kHz to 2 MHz can be transmitted in a good condition to the wide-band amplifier 20 via the rotary transformer 33h.

Figure 4:
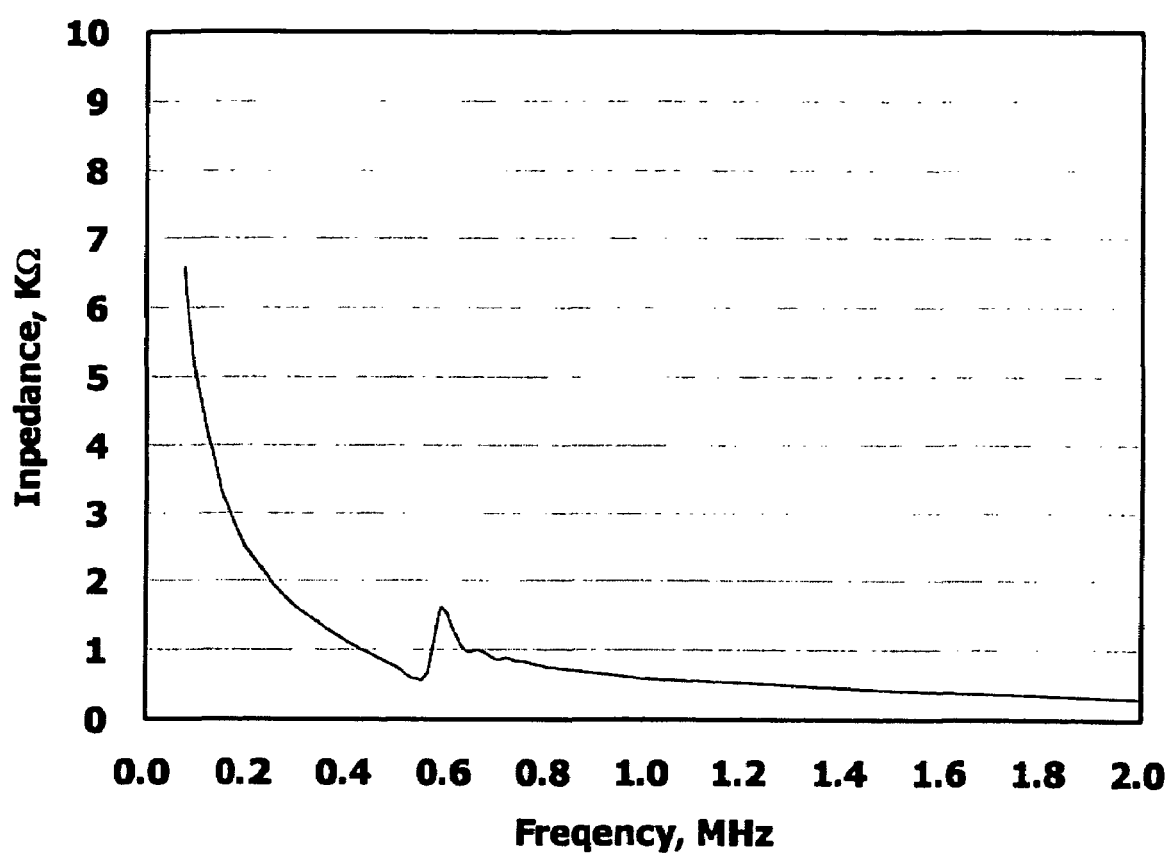
FIG. 4 is a diagram showing the impedance of the AE sensor used in Embodiment 1 of the present invention.

FIG. 4 shows the results of measurement of the internal impedance of the AE sensor 12. From the frequency characteristics of the internal impedance, it can be understood that a capacitance is dominant. Also, the AE sensor 23 has a maximum impedance of 1.5 kΩ at about 300 kHz and at about 600 kHz in the effective sensitivity band from 300 kHz to 2 MHz.

Figure 5:
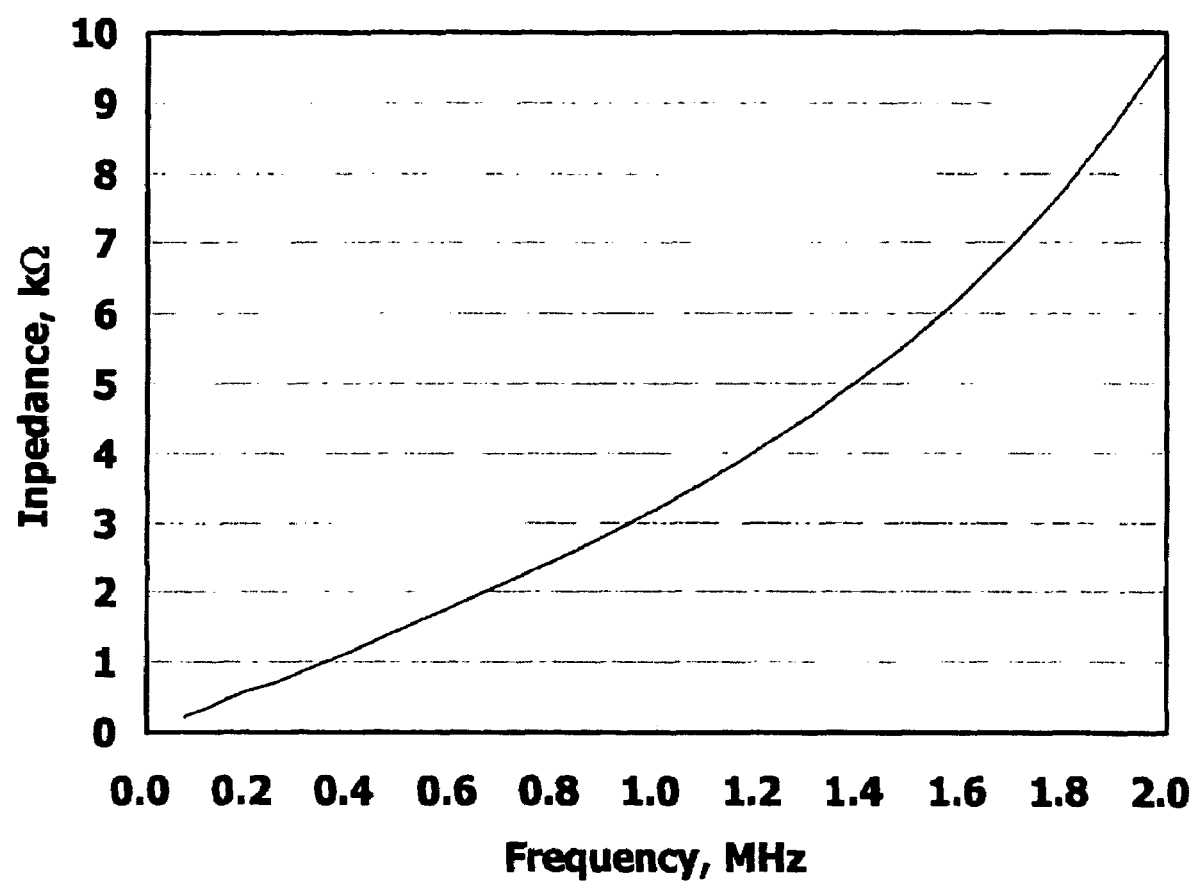
FIG. 5 is a diagram showing the impedance of a rotary transformer used in Embodiment 1 of the present invention.

FIG. 5 shows the results of measurement of the internal impedance of the rotor-side transformer 33g used in Embodiment 1. The rotor-side transformer 33g and the stator-side transformer 33f constituting the rotary transformer 33h were made so as to be identical in construction to each other. Each of rotor-side transformer 33g and the stator-side transformer 33f was made by forming a coil having a diameter of 20 mm and 20 turns of winding of an enamel coated copper wire having a diameter of 0.14 mm and wound around a core made of a ferrite material. The impedance of the rotor-side transformer 33g was measured in a state where the stator-side transformer 33f was opposed to the rotor-side transformer 33g to form a magnetic circuit.

Figure 6:
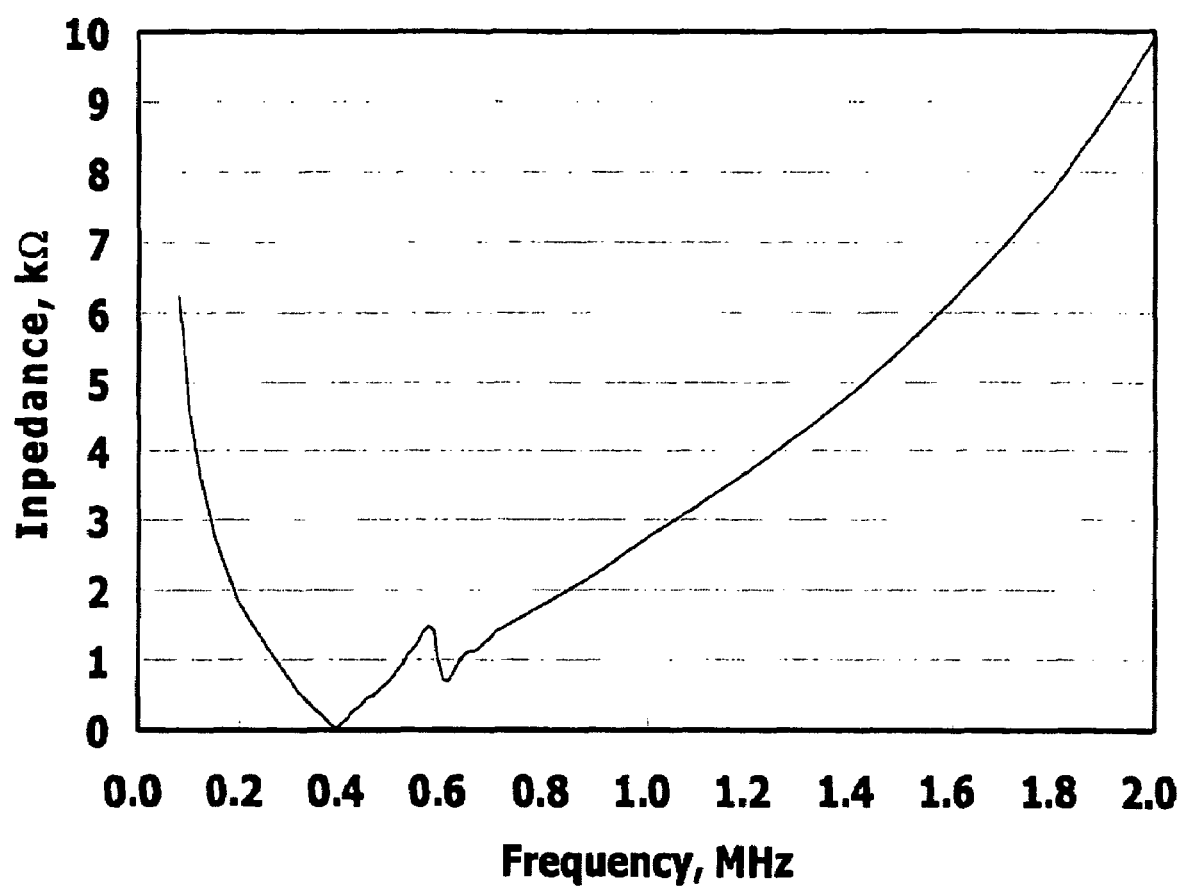
FIG. 6 is a diagram showing the impedance of a circuit formed by the AE sensor and the rotary transformer used in Embodiment 1 of the present invention.

FIG. 6 shows the results of measurement of the impedance of the electrical circuit formed by the AE sensor 12 and the rotor-side transformer 33g. At the time of measurement, the stator-side transformer 33f was opposed to the rotor-side transformer 33g, as in the case of measurement of the internal impedance of the rotor-side transformer 33g. It can be understood, from FIG. 6, that the impedance is markedly low at 400 kHz and resonance occurs at this frequency.

Figure 7:
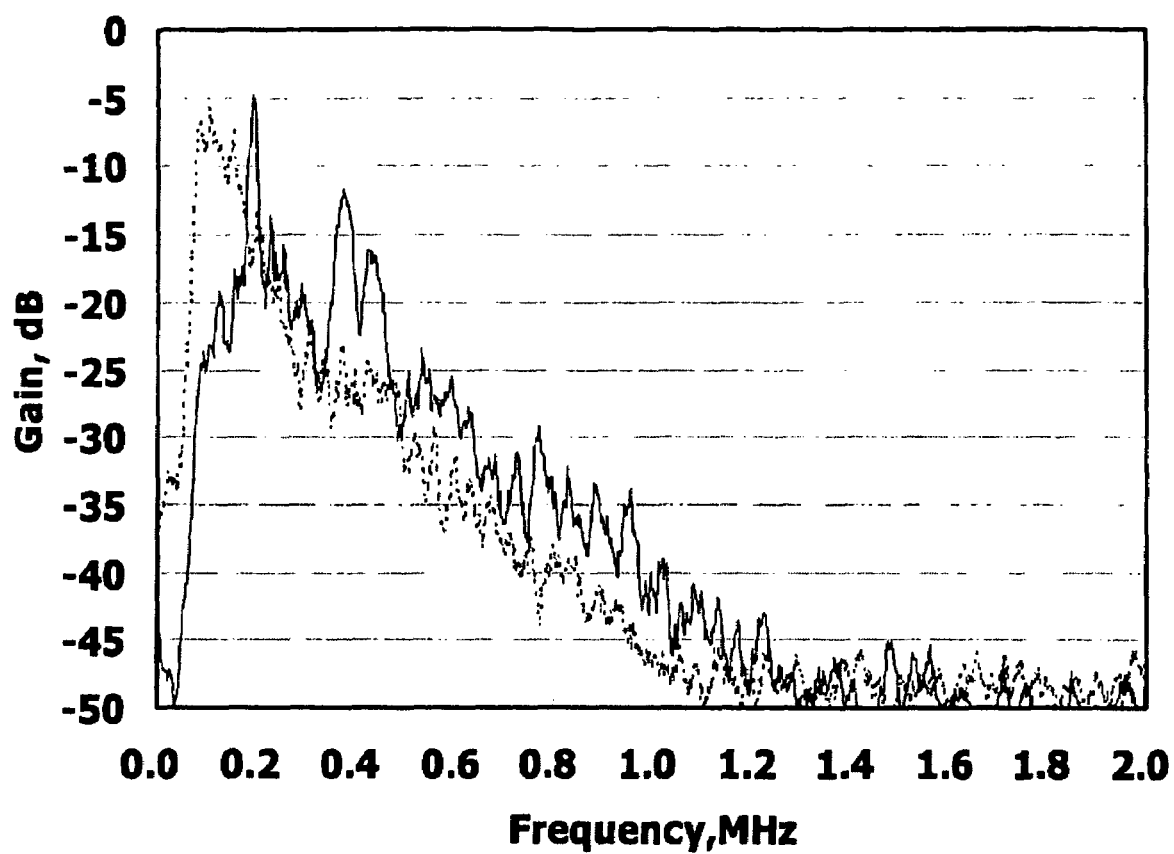
FIG. 7 is a diagram showing an output from the AE sensor used in Embodiment 1 of the present invention.

FIG. 7 shows the results of measurement of the output of the AE sensor 12 through the wide-band amplifier 20 when the bonding surface of the AE sensor 12 was vibrated by a sounding method. In FIG. 7, the solid line indicates the output result when the output signal of the AE sensor 12 in Embodiment 1 was transmitted to the wide-band amplifier 20 via the rotary transformer 33h, and the broken line indicates the output result when the output signal of the AE sensor 12 in Embodiment 1 was directly transmitted to the wide-band amplifier 20. It can be understood from FIG. 7 that the output in the case of transmission to the wide-band amplifier 20 via the rotary transformer 33h is equal to or higher than the output in the case of direct transmission to the wide-band amplifier 20 in the range equal to or higher than 300 kHz, and that the degree of amplification at 400 kHz at which circuit resonance occurs is higher by about 10 dB than that in the case of direct transmission.

As described above, in the contact inspection method in Embodiment 1 of the present invention, the impedance of the rotator-side transformer 33g and the stator-side transformer 33f constituting the rotary transformer 33h is optimized to enable the signal in the effective sensitivity band from 300 kHz to 2 MHz of the AE sensor 12 to be transmitted to the wide-band amplifier 20 without being attenuated.

In optimization of the impedance of the rotator-side transformer 33g and the stator-side transformer 33f, it is desirable, as this Embodiment 1, that the impedance of the rotator-side transformer 33g be higher than the impedance of the piezoelectric element at least in a portion of the effective sensitivity band. It is also desirable to ensure that the impedance of the rotator-side transformer 33g is at least equal to or higher than ½ of the impedance of the piezoelectric element at the lower limit frequency of the effective sensitivity band. Further, it is also desirable that the impedance of the rotator-side transformer 33g is higher than the impedance of the piezoelectric element at the frequency at which the piezoelectric element has the maximum sensitivity.

Further, according to the contact inspection method in Embodiment 1, circuit resonance is utilized to ensure that at 400 kHz at which circuit resonance occurs, the sensitivity is increased by about 10 dB relative to that in the case of direct transmission through the path not including the rotary transformer 33h.

The AE sensor 12 in Embodiment 1 has the maximum sensitivity at 600 to 700 kHz and its effective sensitivity band is 300 kHz to 2 MHz. The characteristics of AE sensors are ordinarily such that that the sensitivity is maximized at the mechanical resonance frequency and is substantially high in a frequency band containing the resonance frequency. AE sensors ordinarily have a mechanical resonance frequency of about 100 kHz to 1 MHz, depending on their size, and have an effective sensitivity band of about 100 kHz to 2 MHz containing the mechanical resonance frequency. Therefore, it is desirable that the resonance frequency of the electrical circuit formed by the AE sensor and the rotary transformer be in the range from 100 kHz to 2 MHz corresponding to the effective sensitivity band of the AE sensor and, further, be in the range from 100 kHz to 1 MHz containing the frequency corresponding to the maximum sensitivity.

In the contact inspection device in Embodiment 1, the AE sensor 12 is fixed on the AE transmission flat plate 11. Therefore there is no need to fix the AE sensor 12 to a new magnetic disk 1 each time the magnetic disk 1 is replaced, and the magnetic disk can be easily changed. It is desirable that the surface of the AE transmission flat plate 11 be smooth as in Embodiment 1, and that a fluid film having a thickness larger than the surface roughness be applied to the surface. This arrangement ensures that the magnetic disk 1 can be easily replaced and the desired closeness of contact with the magnetic disk 1 can be maintained by maintaining pressure contact with the magnetic disk 1 to limit attenuation of AE.

Embodiment 2

Figure 8:
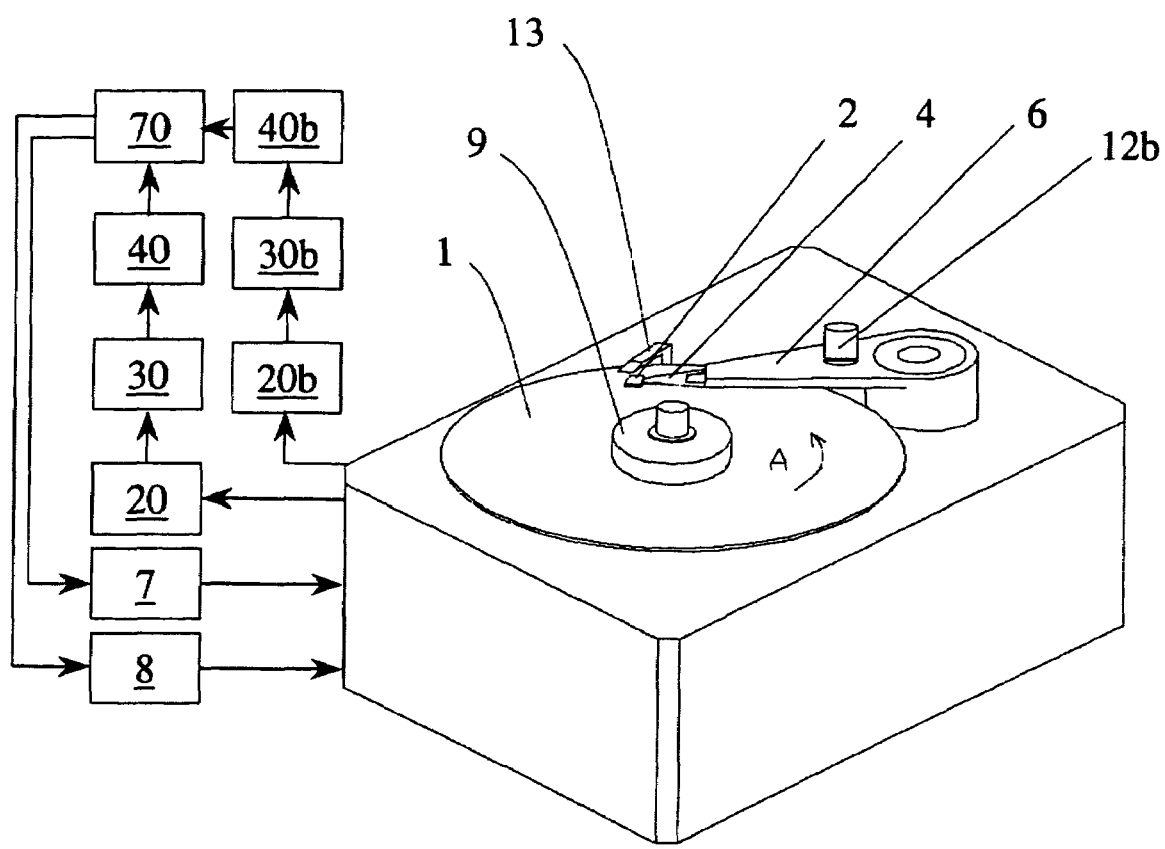
FIG. 8 is a block diagram of a contact inspection device in Embodiment 2 of the present invention.

FIG. 8 shows a block diagram of a contact inspection device in Embodiment 2 of the present invention. The contact inspection device shown in FIG. 8 is basically the same as the contact inspection device of Embodiment 1 shown in FIG. 1. In the contact inspection device shown in FIG. 8, however, an AE sensor 12*b* is also fixed on the arm 6 side. When the arm 6 is turned, the suspension 4 is lifted to a ramp block 13 or moves down from the ramp block 13 to directly unload the slider 2 from the magnetic disk 1 or directly load the slider 2 onto the magnetic disk 1. In FIG. 8, reference character 12*b* denotes an AE sensor fixed by bonding to the arm 6; reference character 20*b* a wide-band amplifier which amplifies a signal from the AE sensor 12*b*; reference character 30*b* a filter circuit for filtering a signal from the wide-band amplifier 20*b*; and reference character 40*b* an effective value computation circuit provided as an effective value computation device for computing the effective voltage value of a signal from the filter circuit 30*b*. Reference numerals 70 denote a computation control circuit which controls each of the drive circuits 7 and 8 and executes various kinds of computational processing, and which is constituted by a personal computer or the like. The computation control circuit 70 also functions as a device for converting each of the detection outputs from the AE sensors 12 and 12*b* from analog signal form to digital signal form and as a device for computing a time difference between maximum values.

Figure 9:
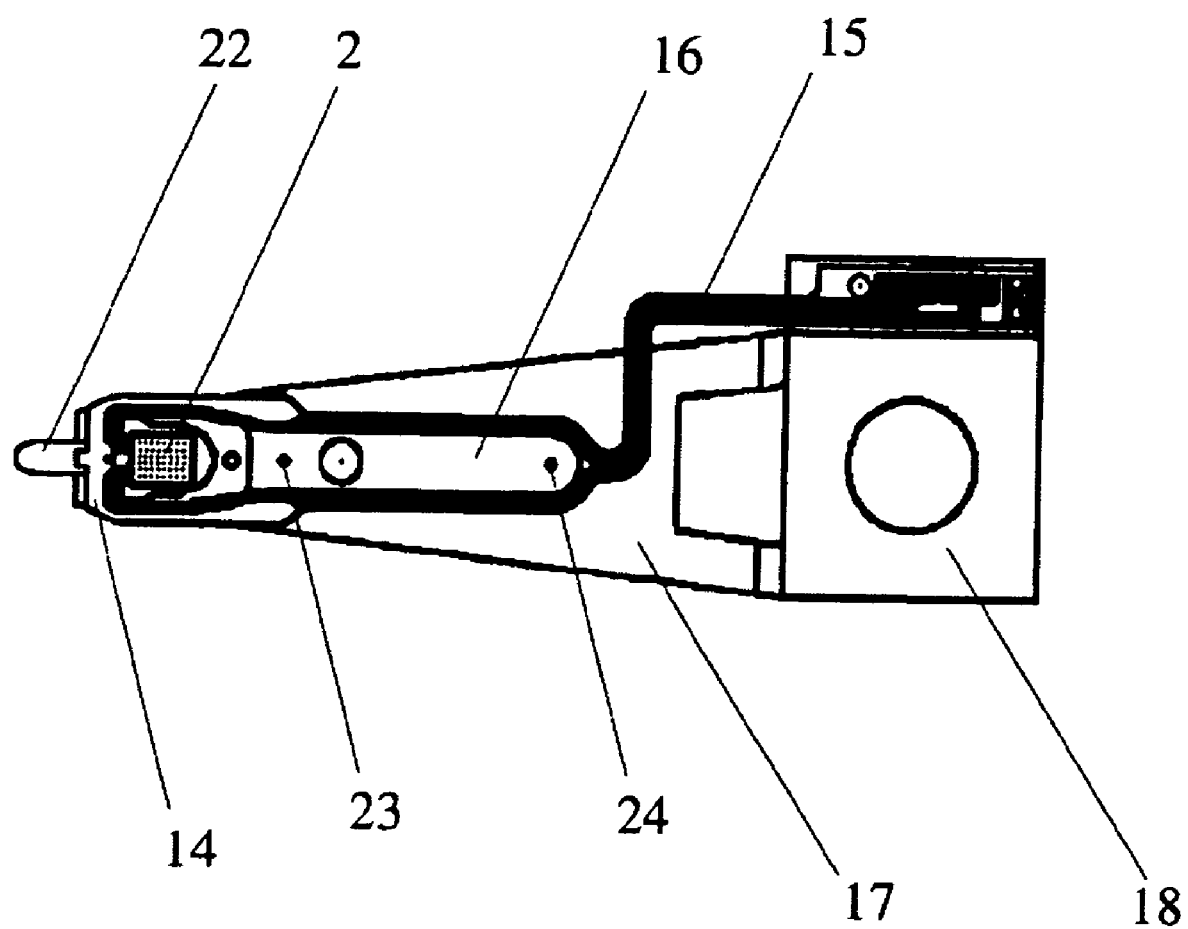
FIG. 9 is a plan view of a suspension used in Embodiment 2 of the present invention.
Figure 10:
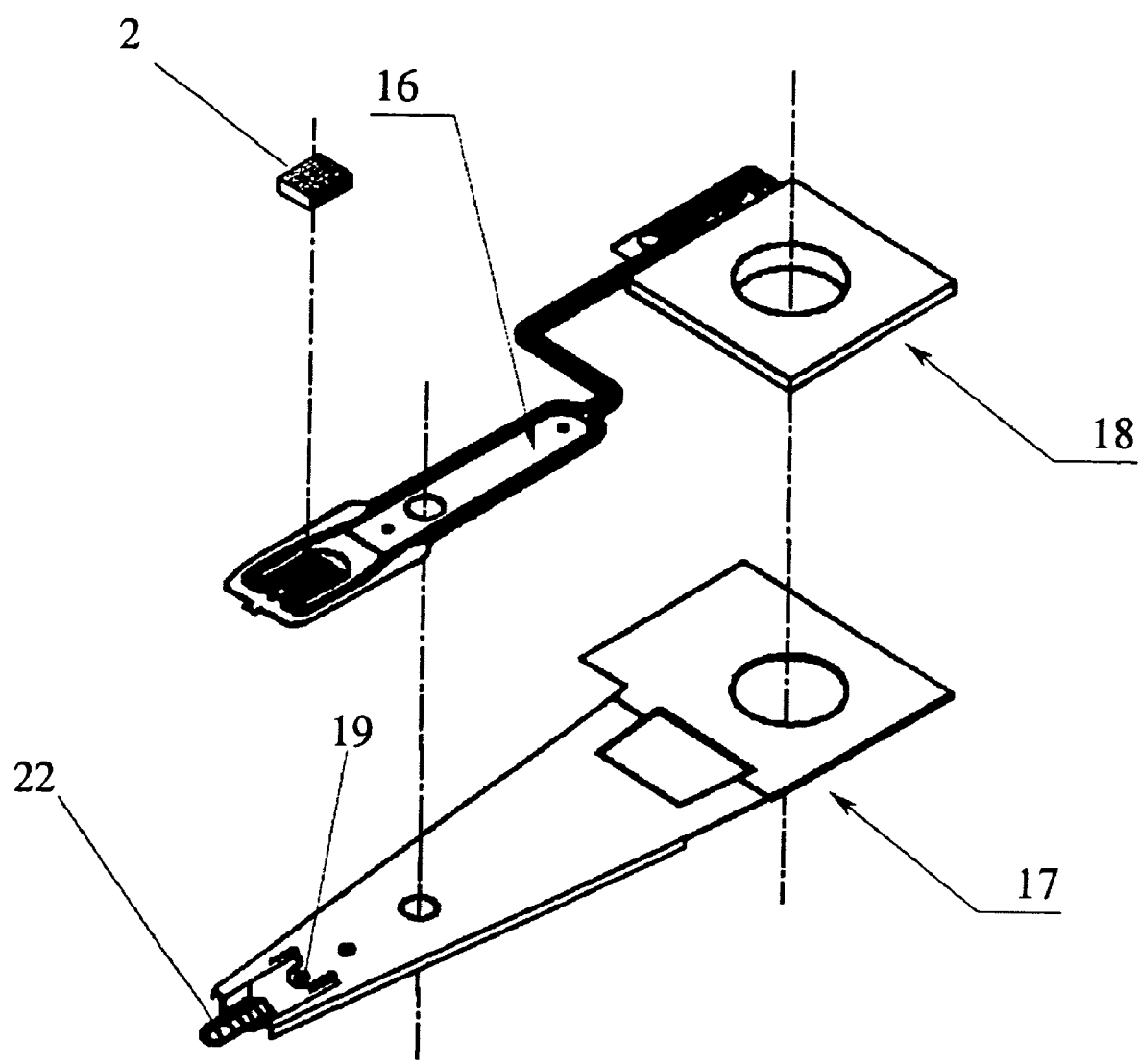
FIG. 10 is an exploded perspective view of the suspension used in Embodiment 2 of the present invention.

FIG. 9 is a diagram showing details of the suspension 4 for pressing the slider 2 toward the magnetic disk 1 in Embodiment 2, as seen from the magnetic disk 1 side. FIG. 10 is an exploded perspective view of the suspension 4 shown in FIG. 9. Referring to FIGS. 9 and 10, the suspension 4 has a flexure 16 including a flexible base 14 which holds the slider 2 in the vicinity of the distal end and a wiring structure member 15, and a load beam 17 which is provided in a direction along the magnetic disk 1, and which supports an end portion of the flexure 16. The load beam 17 is attached to the arm 6 (not shown) through a base plate 18. The flexure 16 is joined by spot welding indicated at 23 and 24 to the surface of the load beam 17 facing the magnetic disk 1. A dimple 19 is also formed in the load beam 17 so as to project on the magnetic disk 1 side. The slider 2 held on the flexure 16 by the dimple 19 is pressed against the magnetic disk 1 while being maintained in a flexible state.

A tab 22 extends as a projecting manner from the distal end of the suspension 4 in the longitudinal direction of the mechanism. The tab 22 runs onto the ramp block 13.

FIGS. 11*a* to 11*d* are diagrams schematically showing the state of the suspension 4 in the unloading process. The unloading process will be described with reference to FIGS. 11*a* to 11*d*.

Figure 11A:
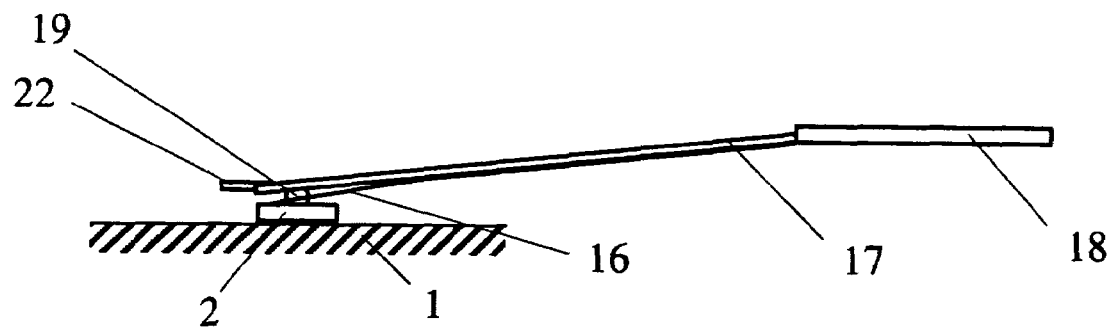
FIGS. 11a to 11d are side views schematically showing an unloading process in Embodiment 2 of the present invention.

FIG. 11*a* shows a state in which the slider 2 is loaded on the magnetic disk 1. The slider 2 is pressed toward the magnetic disk 1 by the suspension 4, but it floats above the magnetic disk 1 surface, with a small gap of about 10 nm maintained between the slider 2 and the magnetic disk 1 surface by an air flow accompanying the rotation of the magnetic disk 1.

Figure 11B:

FIG. 11*b* shows a state at an initial stage of the unloading process. The suspension 4 is gradually lifted as the tab 22 runs onto the ramp block 13. A squeeze force is generated on the slider 2 by the effect of air between the slider 2 and the magnetic disk 1 to attract the slider 2 toward the magnetic disk 1. At this time, so called dimple separation occurs such that the dimple 19 that has pressed the flexure 16 and the flexure 16 separate from each other.

Figure 11C:
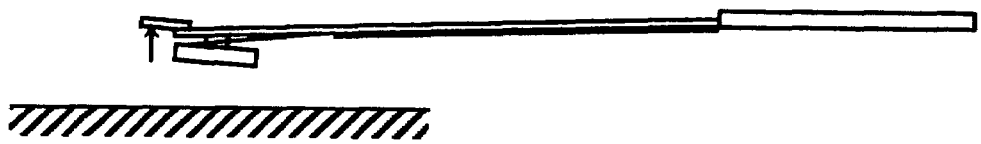

When the suspension 4 is lifted to a position equal to or higher than a certain height as shown in FIG. 11*c*, the slider 2 is unloaded from the magnetic disk 1 and the dimple 19 and the flexure 16 again contact each other. This is so-called dimple contact.

Figure 11D:
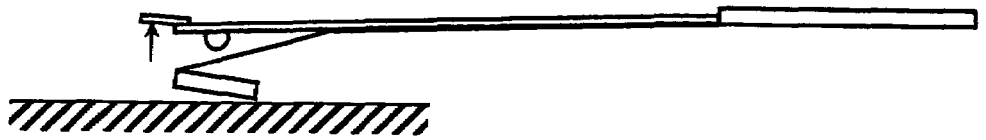

However, as shown in FIG. 11*d*, the flexure 16 vibrates thereafter due to its springy property and the dimple 19 and the flexure 16 again separate from each other. Several events of this contact and separation occur successively.

In the state shown in FIG. 11*b* or 11*d*, there is a possibility of the slider 2 and the magnetic disk 1 contacting each other. When contact therebetween occurs, AE according to the contact intensity is detected by the AE sensor 12 mounted on the magnetic disk 1 side. At this time, AE accompanying the contact between the slider 2 and the magnetic disk 1 is also detected by the AE sensor 12*b* mounted on the arm 6. In this state, the dimple 19 and the flexure 16 are in a dimple separation condition, i.e., in a state of being separated from each other. Accordingly, only the AE transmission path through the flexure 16 exists and the amount of attenuation of AE in the flexure 16 having flexibility is large. However, AE generated at the time of occurrence of contact between the dimple 19 and the flexure 16 as dimple contact shown in FIG. 11*c* propagates through the load beam 17 to be detected as an extremely large output by the AE sensor 12*b*. This AE does not propagate to the magnetic disk 1 and is not detected by the AE sensor 12.

That is, the condition of contact between the slider 2 and the magnetic disk 1 in the slider 2 unloading process comprises the first contact mode shown in FIG. 11*b* and the second contact mode shown in FIG. 11*d*. In the contact inspection method in Embodiment 2, dimple contact between the first contact mode and the second contact mode, shown in FIG. 11*c*, is detected by the AE sensor 12*b*. Therefore, the time difference between the detection signal from the AE sensor 12 and the contact signal from the AE sensor 12*b* are determined by computational processing in the computation control circuit 70, thereby enabling ascertainment as to whether the mode of contact between the slider 2 and the magnetic disk 1 is the first contact mode or the second contact mode.

In a case where AE accompanying contact between the slider 2 and the magnetic disk 1 is evaluated with the AE sensor 12*b* on the arm 6 side, the AE attenuation rate, which depends on the AE transmission path, is changed with the change in state of the suspension 4. It is, therefore, difficult to evaluate the intensity of contact between the slider 2 and the magnetic disk 1 from the detection output from the AE sensor 12*b*. However, if it is evaluated with the AE sensor 12 mounted on the magnetic disk 1 side as in Embodiment 2, there is no change in the AE transmission path and the intensity of contact between the slider 2 and the magnetic disk 1 can be evaluated from the detection output.

While an arrangement for evaluating AE as the effective value of voltage in the effective value computation circuits 40 and 40*b* is used in Embodiment 2, the device for evaluating the output voltages from the AE sensors 12 and 12*b* is not limited to this. For example, the output voltages may be evaluated as envelope outputs by an envelope computation device. In a case where the output voltages from the AE sensors 12 and 12*b* are converted into digital signals to be evaluated as shown in Embodiment 2, the duration of AE generated in the direct loading and direct unloading processes is about 1 ms and each of the transition time from the state shown in FIG. 11b to the state shown in FIG. 11c and the transition time from the state shown in FIG. 11c to the state shown in FIG. 11d is about 1 ms. It is, therefore, desirable to perform evaluation at least at a sampling frequency equal to or higher than 10 kHz in order to correctly grasp AE accompanying contact between the slider 2 and the magnetic disk 1.

Embodiments 1 and 2 have been described by way of example with respect to a case where the rotating body is a magnetic disk 1. However, the present invention is not limited to this. Needless to say, the present invention can be applied to an optical disk, a magneto-optical disk and the like and may be applied as a method of detecting vibration of any rotating body. While a case of providing AE sensor 12 as a vibration detecting element has been described, an acceleration sensor or the like may alternatively be used.

The invention claimed is:

1. A contact inspection method for inspecting vibration conditions of a recording and reproduction device, the device comprising:
    a magnetic disk;
    a slider having a head for recording data to or reproducing data from the magnetic disk; and
    a suspension mechanically connecting the slider and a slider-holding mechanism;
    wherein a first detection element for detecting vibrations is attached to the magnetic disk, and
    a second detection element for detecting vibrations is attached to one of the slider, the suspension, and the slider-holding mechanism;
    the method comprising, when the slider is removed from the magnetic disk:
        detecting a vibration with the second detection element when the slider is separated from the magnetic disk;
        detecting a vibration with the first detection element when the slider and the magnetic disk come into contact with each other;
        determining whether a contact mode when the vibration is detected by the first detection element is a first contact mode in which the slider contacts the magnetic disk by a squeeze force generated by an effect of air between the slider and the magnetic disk, or a second contact mode in which the slider contacts the magnetic disk due to a spring vibration after the slider is separated from the magnetic disk, based on a time difference between a detection output from the first detection element and a detection output from the second detection element.

2. The contact inspection method according to claim 1, wherein effective values of the detection outputs from the first detection element and the second detection element are calculated based on the detection outputs from the first detection element and the second detection element, and the contact mode is determined based on the calculated effective values of the detection outputs.

3. The contact inspection method according to claim 1, wherein envelopes of the detection outputs from the first detection element and the second detection element are calculated based on the detection outputs from the first detection element and the second detection element, and the contact mode is determined based on the calculated envelopes of the detection outputs.

4. The contact inspection method according to claim 1, wherein the detection output from the first detection element is connected to a rotary transformer fixed to the magnetic disk, and the rotary transformer has an input impedance which is higher than an impedance of the first detection element in at least a portion of an effective sensitivity band in which the first detection element has a sensitivity not lower than $1/10$ of a maximum sensitivity of the first detection element.

5. The contact inspection method according to claim 4, wherein when the impedance of the first detection element is Z1 and the input impedance of the rotary transformer is Z2, and the effective sensitivity band reaches a lower limit frequency when $Z2 > 0.5 \times Z1$.

6. The contact inspection method according to claim 4, wherein when the impedance of the first detection element is Z1 and the input impedance of the rotary transformer is Z2, the first detection element operates at a frequency providing the maximum sensitivity when $Z2 > Z1$.

7. The contact inspection method according to claim 4, wherein an electrical circuit including the first detection element and a rotor-side coil of the rotary transformer has a resonance frequency within the effective sensitivity band of the first detection element.

8. The contact inspection method according to claim 4, wherein the first detection element is a piezoelectric element, and
    an electrical circuit including the first detection element and a rotor-side coil of the rotary transformer has a resonance frequency within a range in the effective sensitivity and in which the first detection element has a sensitivity not less than $1/10$ of the maximum sensitivity of the first detection element.

9. A contact inspection device comprising:
    a rotating magnetic disk;
    a slider having a head for recording data to and reproducing data from the magnetic disk;
    a slider-holding mechanism;
    a suspension connecting the slider to the slider-holding mechanism;
    a first detection element for detecting vibrations of the magnetic disk, the first detection element being attached to the magnetic disk;
    a second detection element for detecting vibrations caused when the slider is removed from the magnetic disk, the second detection element being attached to one of the slider, the suspension and the slider holding mechanism; and
    a measurement device for determining whether a contact mode when the vibration is detected by the first detection element is a first contact mode in which the slider contacts the magnetic disk by a squeeze force generated by an effect of air between the slider and the magnetic disk, or a second contact mode in which the slider contacts the magnetic disk due to a spring vibration after the slider is unloaded from the magnetic disk, based on a time difference between a detection output from the first detection element and a detection output from the second detection element.

* * * * *